(12) United States Patent
Lee et al.

(10) Patent No.: US 7,171,503 B2
(45) Date of Patent: Jan. 30, 2007

(54) MINI PCI MODULE HAVING INTEGRATED ANTENNA PIN SET FOR ELECTRICALLY CONNECTING TO AN ANTENNA SET IN A MINI PCI SLOT

(75) Inventors: Chia-Hsien Lee, Taipei Hsien (TW); Chu-Chia Tsai, Taipei Hsien (TW); Kun-Shan Lee, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 91 days.

(21) Appl. No.: 10/906,034

(22) Filed: Jan. 31, 2005

(65) Prior Publication Data

US 2006/0149879 A1 Jul. 6, 2006

(30) Foreign Application Priority Data

Dec. 31, 2004 (TW) .............................. 93141791 A

(51) Int. Cl.
*G06F 13/00* (2006.01)

(52) U.S. Cl. ..................... 710/300; 710/309; 710/64; 710/72; 361/683

(58) Field of Classification Search ........ 710/300–317, 710/62–64, 72; 361/683, 737, 868, 752
See application file for complete search history.

(56) References Cited

U.S. PATENT DOCUMENTS

| 6,598,109 | B1 * | 7/2003 | McAlister et al. ........... 710/306 |
| 6,717,801 | B1 * | 4/2004 | Castell et al. ............... 361/683 |
| 6,760,804 | B1 * | 7/2004 | Hunt et al. .................. 710/313 |
| 6,985,354 | B2 * | 1/2006 | Yang et al. .................. 361/683 |
| 2006/0020979 | A1 * | 1/2006 | Lee et al. ..................... 725/80 |

* cited by examiner

*Primary Examiner*—Mark H. Rinehart
*Assistant Examiner*—Raymond N Phan
(74) *Attorney, Agent, or Firm*—Winston Hsu

(57) ABSTRACT

A mini PCI module includes a mini PCI card and a mini PCI slot for the mini PCI card to be inserted into. The mini PCI card includes 124 signal pins and an antenna pin set. The mini PCI slot includes 124 signal connection ends corresponding to the 124 signal pins, and an antenna connection end set corresponding to the antenna pin set for electrically connecting to an antenna set.

20 Claims, 6 Drawing Sheets

MINI PCI MODULE HAVING INTEGRATED ANTENNA PIN SET FOR ELECTRICALLY CONNECTING TO AN ANTENNA SET IN A MINI PCI SLOT

BACKGROUND OF INVENTION

1. Field of the Invention

The present invention relates to a mini peripheral component interconnect (PCI) module, and more particularly, to a mini PCI module having an antenna pin set for electrically connecting to an antenna set.

2. Description of the Prior Art

Peripheral component interconnect (PCI) is a kind of interconnect systems for connecting a processor to a peripheral component. Through the use of a PCI, a processor can support a modern PCI card and an old-fashioned industry standard architecture (ISA) card at the same time.

A PCI can comprise 124, or 188 signal pins. For example, a 124-pin PCI includes 32 signal pins reserved for exchanging signals, and 92 remaining signal pins for electrically connecting to ground, a source, or without any predefined purposes, which are named spare signal pins.

In recent years, in accordance with the explosive development of information technology, the PCI are developed to have a variety of types, such as a compact PCI, a low profile PCI, a concurrent PCI, and a mini PCI, etc., to meet a variety of demands.

For example, a mini PCI is developed to meet a demand of wireless communications. A mini PCI card is defined to be 2.75 inches long, 1.81 inches wide, and 0.22 inches thick. Therefore, the mini PCI can be installed in a compact electronic apparatus, such as a notebook, a printer, and a Net PC, etc.

Please refer to FIG. 1, which is a schematic diagram of an upside down disposed traditional notebook 10 having a first mini PCI module 30 according to the prior art. In addition to the mini PCI module 30, the notebook 10 further comprises a housing 12, a main circuit board 14 installed in the housing 12, an antenna set 16 installed on the housing 12, an antenna connection set 18 installed in the housing 12 for electrically connecting the antenna set 16 to the first mini PCI module 30, and a plurality of main electronic components 20 installed on the main circuit board 14.

The first mini PCI module 30 comprises a mini PCI card 34, and a mini PCI slot 32 for the mini PCI card 34 to be inserted into. The mini PCI slot 32 comprises 124 signal connection ends 36 equally above and below disposed in parallel to each other. The 124 signal connection ends 36 are all electrically connected to the main electronic component 20. The mini PCI card 34 comprises a secondary circuit board 38, a plurality of secondary electronic components 40 installed on the secondary circuit board 38, an antenna connection end set 42 installed on the secondary circuit board 38 for electrically connecting the antenna connection set 18 to the secondary electronic component 40, and 124 signal pins 44 equally above and below installed in parallel to each other on the secondary circuit board 38. The 124 signal pins 44 are all electrically connected to the secondary electronic component 40.

The 124 signal connection ends 36 of mini PCI slot 32 are installed corresponding to the 124 signal pins 44 of the mini PCI card 34. Therefore, when the mini PCI card 34 is inserted into the mini PCI slot 32, any one of the signal pins 44 is electrically connected to its corresponding signal connection end of the signal connection ends 36.

When the mini PCI card 34 is inserted into the mini PCI slot 32 and the antenna connection set 18 is electrically connected to the antenna connection end set 42, a wireless signal the antenna set 16 receives can travel from the antenna connection set 18, via the antenna connection end set 42, the secondary electronic component 40, the signal pins 44, and the signal connection ends 36, to the main electronic component 20; On the other hand, an analog signal the main electronic component 20 generates can travel from the signal connection ends 36, the signal pins 44, the secondary electronic component 40, the antenna connection end set 42, and the antenna connection set 18, to the antenna set 16.

As described previously, since the compact notebook 10 can comprise only one mini PCI, and the mini PCI slot 32 is in general exclusive for a WLAN mini PCI module to meet the demand of wireless communications, the notebook 10 has a limited number of expandable functions.

Moreover, after the mini PCI card 34 is inserted into the mini PCI slot 32, the main electronic component 20 cannot exchange signals with the antenna set 16 unless antenna connection set 18 of the antenna set 16 has been electrically connected to the antenna connection end set 42 of the mini PCI card 34. However, since the antenna connection set 18, nor does the antenna connection end set 42, does not have a robust structure durable enough for a user to electrically connect the antenna connection set 18 to the antenna connection end set 42 at will, in order not to make any impacts to either of the antenna connection set 18 and the antenna connection end set 42, the manually connecting operation to electrically connect the antenna connection set 18 to the antenna connection end set 42 had better been accomplished by a professional factory assembly worker. Additionally, the factory assembly worker further has to insert the mini PCI card 34 into the mini PCI slot 32 before the notebook 10 is handed over to a user. According to such a scenario, the notebook 10 is expensive, and the user cannot select another mini PCI card to replace the mini PCI card 34, which is already inserted into the mini PCI slot 32.

Lastly, if a notebook does not have the WLAN mini PCI installed, but an Analog TV mini PCI for example instead, the housing 12 of the notebook 10 can not be utilized by the notebook, unless the housing 12 further comprises a plurality of audio/video (A/V) holes for their corresponding A/V terminals to be inserted. That is to say, the notebook with the Analog TV mini PCI cannot utilize the ready-made housing 12, and has to utilize another housing of a new model.

SUMMARY OF INVENTION

It is therefore a primary objective of the claimed invention to provide a mini PCI module having an antenna pin set for electrically connecting to an antenna set, so as to overcome the drawbacks of the prior art.

According to the claimed invention, the mini PCI module includes a mini PCI card and a mini PCI slot for the mini PCI card to be inserted into. The mini PCI card includes a secondary circuit board, a fool-proof device installed on the secondary circuit board, a first signal pin installed by a first side of the fool-proof device on a first surface of the secondary circuit board, 61 second signal pins installed by a second side of the fool-proof device on the first surface of the secondary circuit board, a third signal pin installed by the first side of the fool-proof device on a second surface of the secondary circuit board, 61 fourth signal pins installed by the second side of the fool-proof device on the second surface of the secondary circuit board, and the antenna pin set installed on the secondary circuit board; The mini PCI slot includes a first signal connection end corresponding to the first signal pin of the mini PCI card, 61 second signal connection ends corresponding to the 61 second signal pins of the mini PCI card, a third signal connection end corresponding to the third signal pin of the mini PCI card, 61 fourth signal connection ends corresponding to the 61 fourth signal pins of the mini PCI card, and an antenna connection end set corresponding to the antenna pin set of the mini PCI card for electrically connecting to the antenna set. When the mini PCI card is inserted into the mini PCI slot, the first signal pin is electrically connected to the first signal connection end, the 61 second signal pins are electrically connected to the 61 second signal connection ends, the third signal pin is electrically connected to the third signal connection end, the 61 fourth signal pins are electrically connected to the 61 fourth signal connection ends, and the antenna pin set is electrically connected to the antenna connection end set.

It is an advantage of the claimed invention that the mini PCI module, in addition to the 124 signal pins and the 124 signal connection ends, further includes the antenna pin set and the antenna connection end set. Therefore, an antenna set of a notebook having the mini PCI module can be electrically connected to the antenna connection end set of the mini PCI module in advance, and a main electronic component of the notebook can exchange signals with the antenna set right after the mini PCI card is inserted into the mini PCI slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
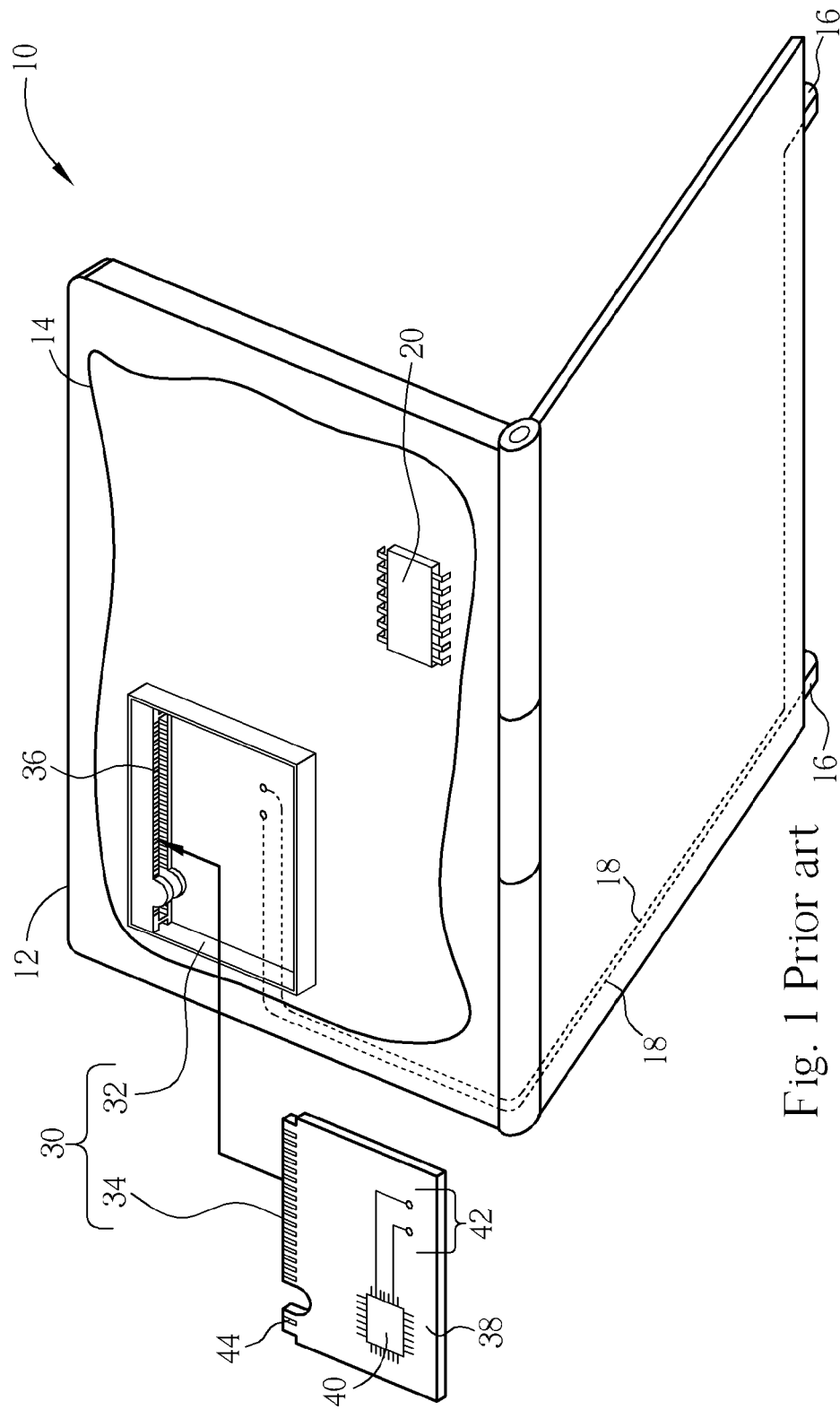
FIG. 1 is a schematic diagram of an upside down disposed notebook having a first mini PCI module according to the prior art.
Figure 2:
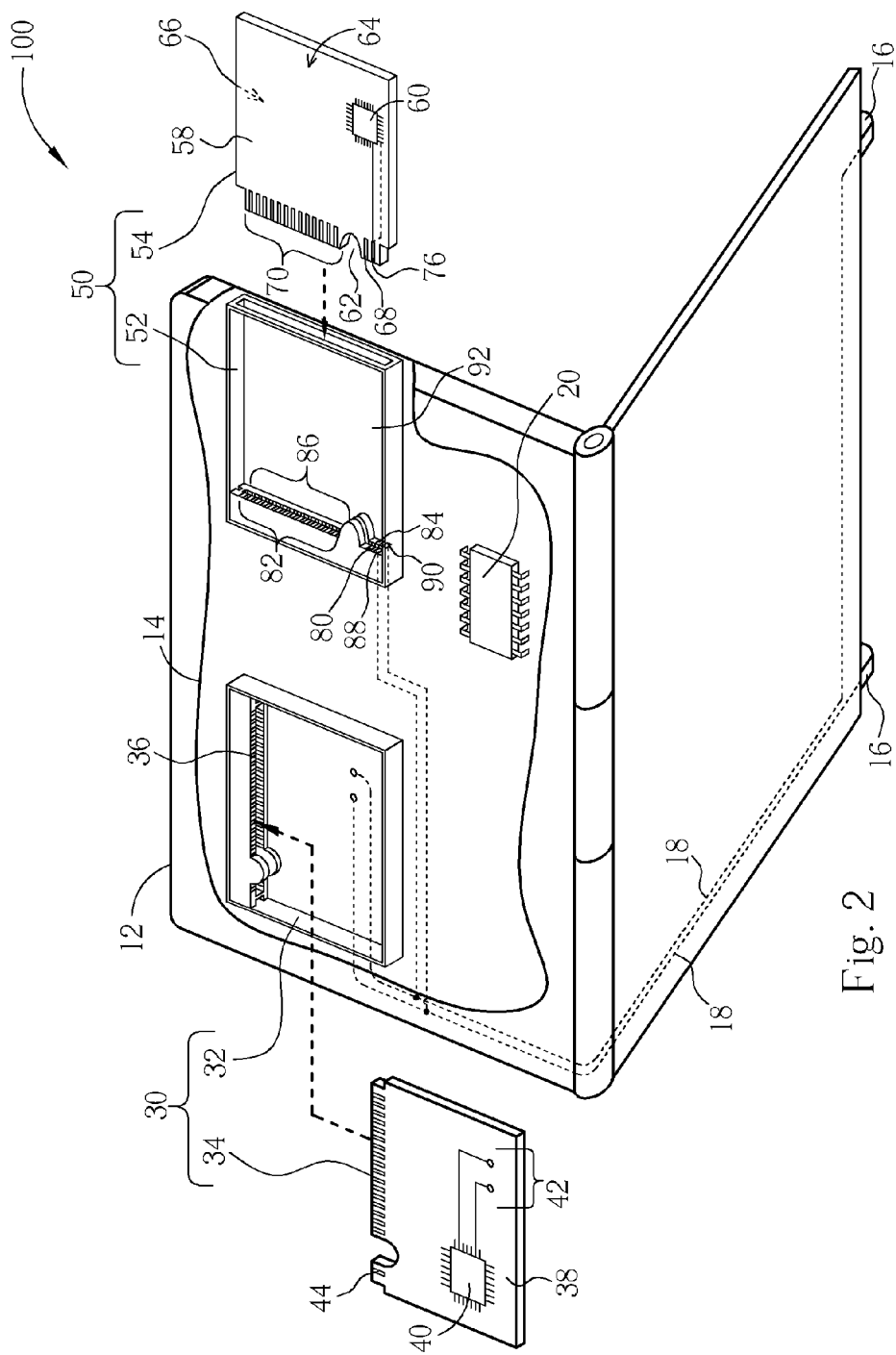
FIG. 2 is a schematic diagram of an upside down disposed notebook having a second mini PCI module of the preferred embodiment according to the present invention.

Please refer to FIG. 2, which is a schematic diagram of a notebook 100 having a second PCI module 50 of the preferred embodiment according to the present invention. In addition to the second mini PCI module 50, the notebook 100 further comprises the housing 12, the main circuit board 14, the antenna set 16, the antenna connection set 18, the main electronic component 20, and the first mini PCI module 30.

The structure, the connection, and the operation of the main circuit board 14, the antenna set 16, the antenna connection set 18, the main electronic component 20, and the first mini PCI module 30 have been described previously, further description hereby omitted.

The second mini PCI module 50 comprises a mini PCI card 54, and a mini PCI slot 52 for the mini PCI card 54 to be inserted into. The mini PCI card 54 comprises a secondary circuit board 58, a plurality of the secondary electronic component 60 installed on the secondary circuit board 58, a fool-proof device 62 installed on the secondary circuit board 58, a first signal pin 68 installed by the first side of the fool-proof device 62 on the first surface 64 of the secondary circuit board 58, 61 second signal pins 70 installed by a second side of the fool-proof device 62 on the first surface 64 of the secondary circuit board 58, a third signal pin 72 installed by the first side of the fool-proof device 62 on a second surface 66 of the secondary circuit board 58, 61 fourth signal pins 74 installed by the second side of the fool-proof device 62 on the second surface 66 of the secondary circuit board, a first antenna pin 76 installed by the first side of the fool-proof device 62 on the first surface 64 of the secondary circuit board 58, and a second antenna pin 78 installed by the first side of the fool-proof device 62 on the second surface 66 of the secondary circuit board 58. Since installed on the second surface 66 of the secondary circuit board 58, the third signal pin 72, the 61 fourth signal pins 74, and the second antenna pin 78 are all not shown in FIG. 2.

Of the mini PCI card 54, the first signal pin 68, the 61 second signal pins 70, the third signal pin 72, the 61 fourth signal pin 74, the first antenna pin 76, and the second antenna pin 78 are all electrically connected to the secondary electronic component 60.

The mini PCI slot 52 comprises a concave part (not shown), a first signal connection end 80 corresponding to the first signal pin 68, 61 second signal connection ends 82 corresponding to the second signal pins 70, a third signal connection end 84 corresponding to the third signal pin 72, 61 fourth signal connection ends 86 corresponding to the fourth signal pins 74, a first antenna connection end 88 corresponding to the first antenna pin 76, a second antenna connection end 90 corresponding to the second antenna pin 78, and a fool-proof device (not shown) corresponding to the fool-proof device 62 of the mini PCI card 54. Of course, the fool-proof device is installed in the concave part.

As shown in FIG. 2, the first signal connection end 80, the 61 second signal connection ends 82, and the first antenna connection end 88 are all installed on an upper surface of the concave part, while the third signal connection end 84, the 61 fourth signal connection ends 86, and the second antenna connection end 90 are all installed on a lower surface of the concave part.

Of the mini PCI slot 52, the first signal connection end 80, the 61 second signal connection ends 82, the third signal connection end 84, and the 61 fourth signal connection ends 86 are all electrically connected to the main electronic component 20.

Of the preferred embodiment, in addition to the antenna connection end set 42 of the mini PCI card 34, the antenna connection set 18 is further electrically connected the first antenna connection end 88 and the second antenna connection end 90 of the mini PCI slot 52. Therefore, when the mini PCI card 54 is inserted into the mini PCI slot 52, the first antenna pin 76, and the second antenna pin 78 as well, is electrically connected to the antenna set 16, and a wireless signal the antenna set 16 receives can travel from the antenna connection set 18, via an antenna connection end set consisting of the first antenna connection end 88 and the second antenna connection end 90, an antenna pin set consisting of the first antenna pin 76 and the second antenna pin 78, the secondary electronic component 60, the signal pins of the mini PCI card 54 (including the first signal pin 68, the 61 second signal pins 70, the third signal pin 72, and the 61 fourth signal pins 74), and the signal connection ends of the mini PCI slot (including the first signal connection end 80, the 61 second signal connection ends 82, the third signal connection end 84, and the 61 fourth signal connection ends 86), to the main electronic component 20; On the other hand, an analog signal the main electronic component 20 generates can travel from the signal connection ends of the mini PCI slot 52, via the signal pins of the mini PCI card 54, the secondary electronic component 60, the antenna pin set, the antenna connection end set, and the antenna connection set 18, to the antenna set 16.

Of the notebook 100, since the mini PCI slot 52 is electrically connected to the antenna set 16, speaking specifically both the first antenna connection end 88 and the second antenna connection end 90 is electrically connected via the antenna connection set 18 to the antenna set 16, the main electronic component 20 therefore can exchange signals with the antenna set 16 right after the mini PCI card 54 is inserted into the mini PCI slot 52, without performing the manually connecting operation, which may make impacts to the antenna connection set 18, and the second mini PCI module 50 can have a longer life-span. Accordingly, the mini PCI card 54 of the second mini PCI module 50 can be handed over to a user, and the user can insert the mini PCI card 54 into the mini PCI card 54, easing the burden of the factory assembly worker to insert the mini PCI card 34 into the mini PCI slot 32. According to such a scenario, the user can of course insert any mini PCI card, in addition to the WLAN mini PCI card, to the mini PCI slot 52, and the notebook 100 can have other functions in addition to the wireless communications.

Of the preferred embodiment, the first antenna pin 76 and the second antenna pin 78 of the mini PCI card 54 are both installed by the fist side of the fool-proof device 62, and the first antenna pin 76 and the second antenna pin 78 are installed on the first surface 64 and the second surface 66 of the secondary circuit board 58 respectively. However, of a mini PCI module of the present invention, a first antenna pin and a second antenna pin can be both installed on a first surface or on a second surface of a secondary circuit board, and the first antenna pin and the second antenna pin can be installed by a first side and a second side of a fool-proof device respectively.

Figure 3:
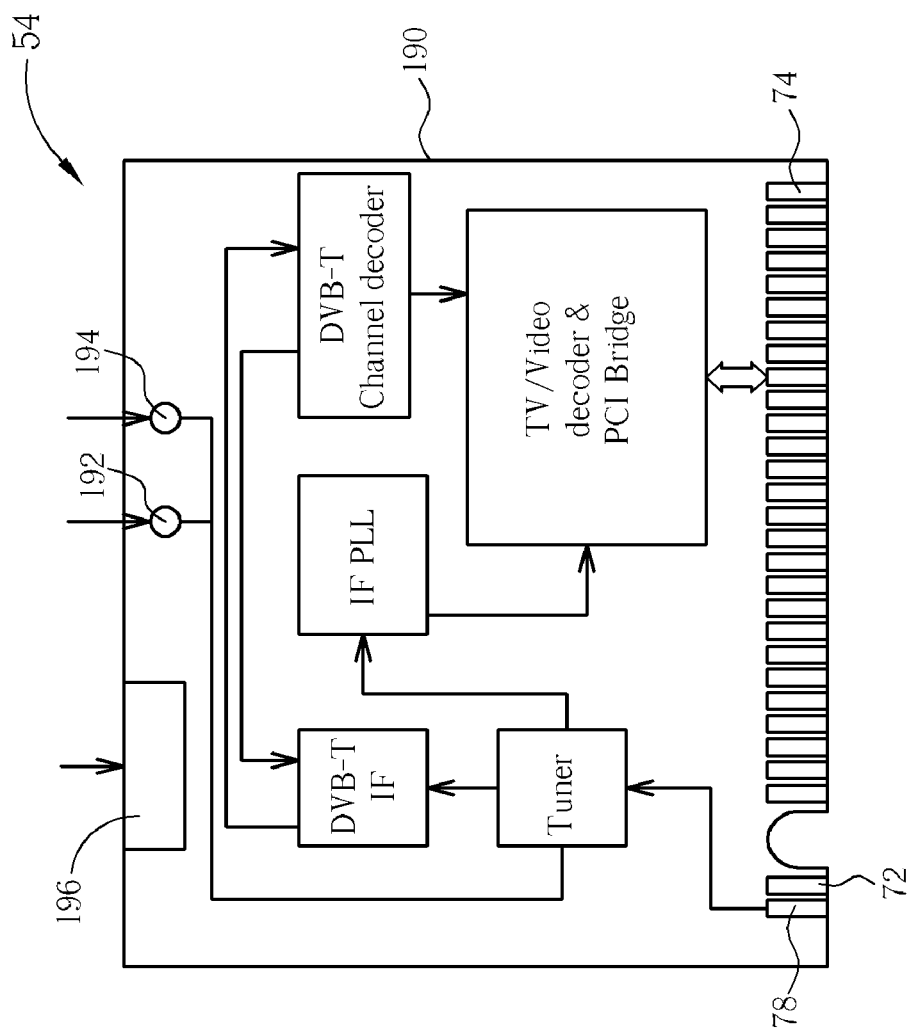
FIG. 3 is a function block diagram of an Analog TV module, which is a secondary electronic component of the second mini PCI module shown in FIG. 2.

Since the mini PCI card 54 can be handed over to a user, who can insert the mini PCI card 54 to the mini PCI slot 52 in person, the mini PCI card 54 of the preferred embodiment further comprises a mini PCI housing 190 for packaging the secondary circuit board 58, shown in FIG. 3 where the secondary electronic component 60 is an Analog TV module. The mini PCI housing 190 is installed to prevent the user to touch and make any impacts to the secondary electronic component 60 in an inserting process of the mini PCI card 54 into the mini PCI slot 52.

Of the preferred embodiment, the mini PCI slot 52 is installed in the notebook 100, as shown in FIG. 2, and the notebook 100 in accordingly has to further comprises a reserved space 92 for accommodating the mini PCI card 54. However, as mentioned previously, having too small a capacity to accommodate too many electronic components, signal connection ends and an antenna connection end set of a mini PCI slot of a mini PCI module of a notebook of the present invention can be installed in a region close to a border of the housing 12, so that part of the mini PCI card, after inserting into the mini PCI slot, is exposed to a region outside of the housing 12, and the notebook does not have to comprise the reserved space 92 and has a more compact size.

Of the preferred embodiment, the secondary electronic component 60 of the mini PCI card 54 can be a Bluetooth module, or an audio/video (A/V) module, such as an Analog TV module, a Digital TV module, an Analog/Digital TV module, a GPS TV module, and a GPRS TV module, etc.

Figure 4:
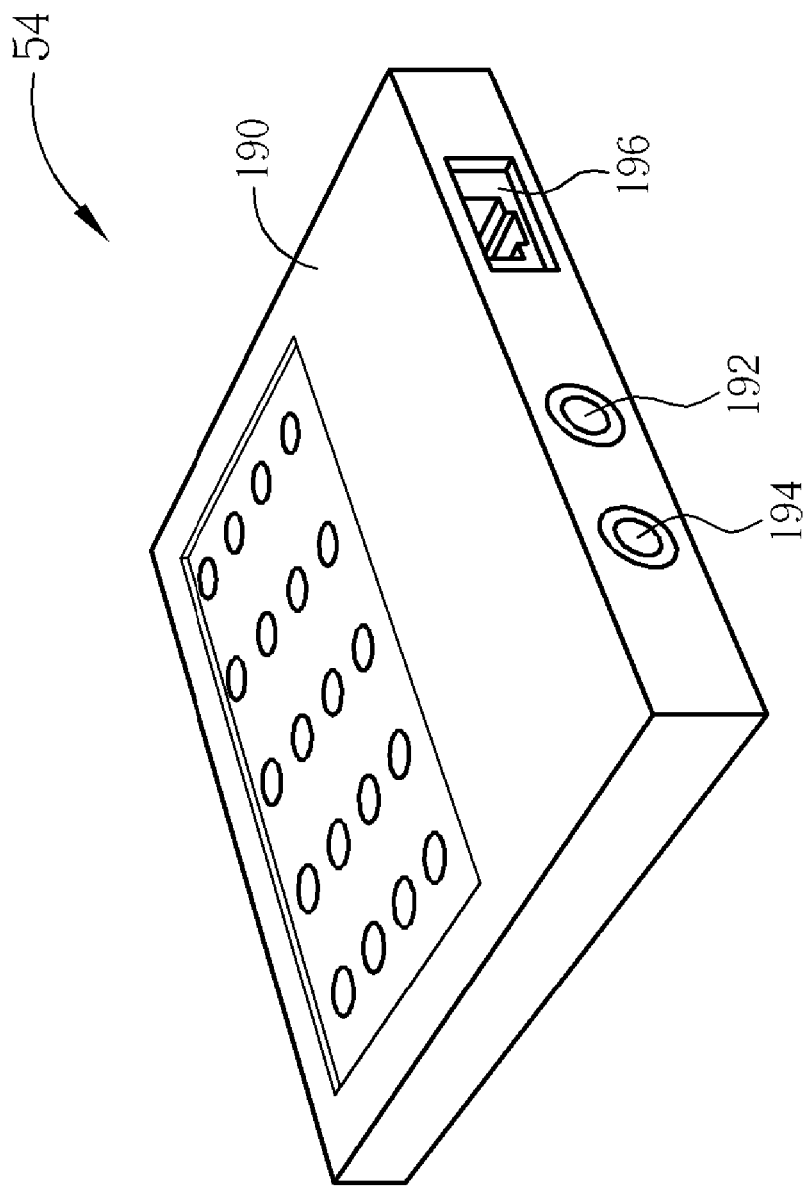
FIG. 4 is a front view of a mini PCI card of the second mini PCI module shown in FIG. 2, a secondary electronic component of the mini PCI module being an Analog TV module.
Figure 5:
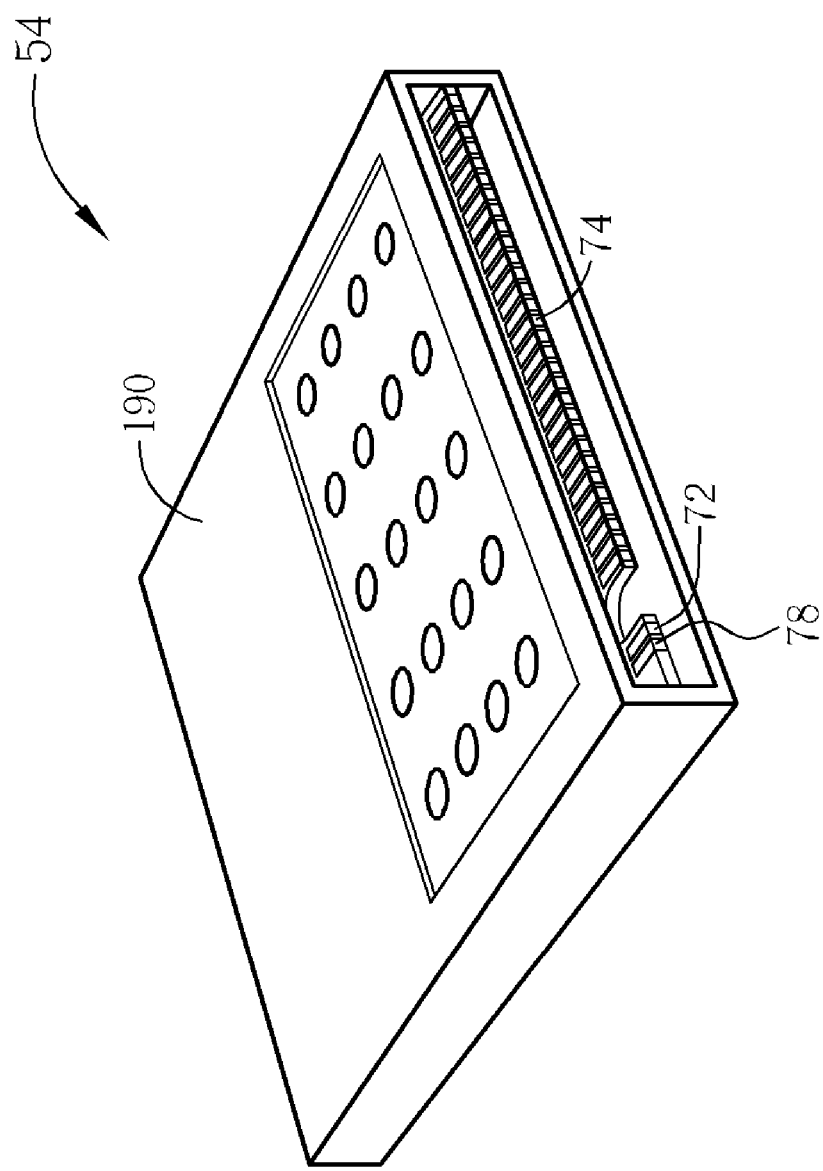
FIG. 5 is a rear view of the mini PCI card shown in FIG. 4.

If the secondary electronic component 60 of the mini PCI card 54 is the Analog/Digital TV module, as shown in FIG. 3 to FIG. 5, FIG. 3 being a function block diagram of the Analog/Digital TV module, which comprises a TV/Video decoder & PCI Bridge, a DVB-T channel decoder (demodulator), an intermediate frequency phase-locked loop (IF PLL), a DVB-T IF, and a tuner, and FIG. 4 and FIG. 5 a front view and a rear view of the mini PCI card 54 respectively, the mini PCI card 54 can comprise a plurality of A/V holes installed on the mini PCI housing 190 for their corresponding A/V terminal to be inserted into, such as an Analog TV input hole 192, a Digital TV input hole 194, and an Audio L/R-S-Video-Composite Video (AVS) input hole 196. The A/V input holes are all electrically connected to the A/V module, i.e. the Analog/Digital TV module. Therefore, the notebook 100 can continue using a housing, which does not comprise any A/V input holes and is applied to a notebook which does not support any A/V functions, as the housing 12, without the use of another housing of a new model.

Figure 6:
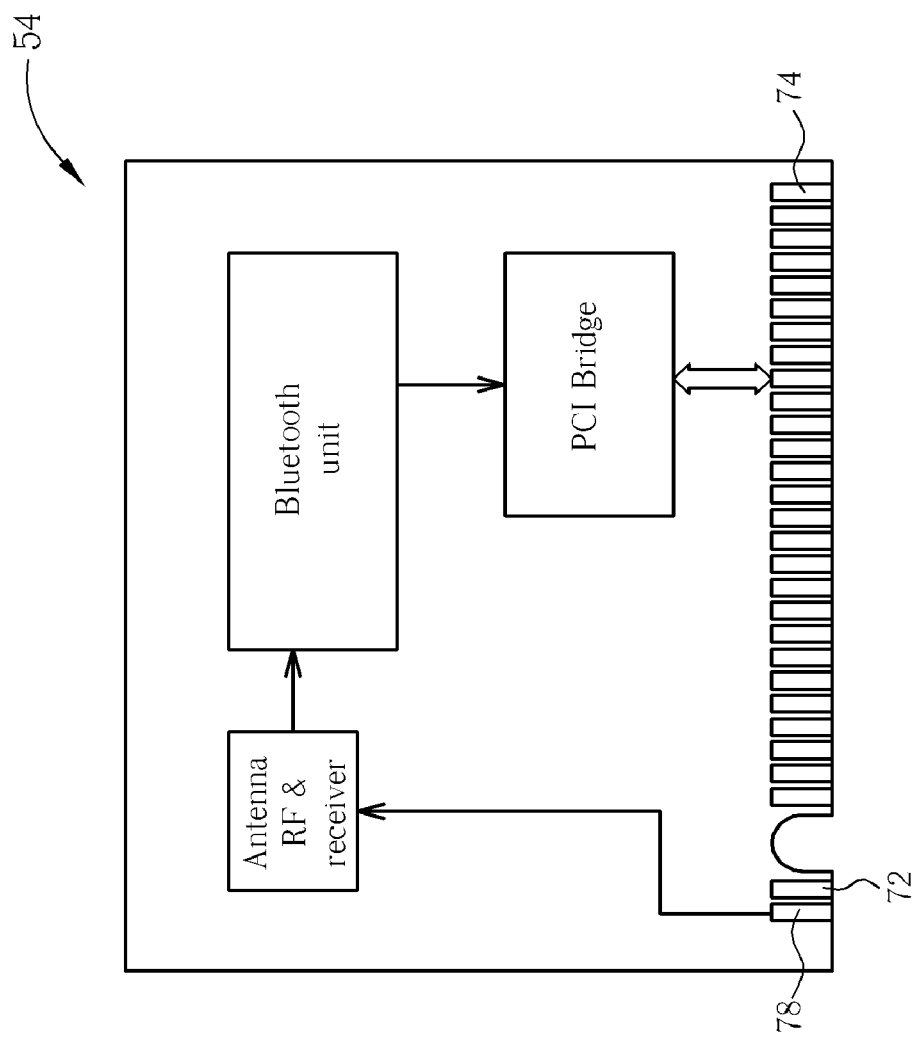
FIG. 6 is a function block diagram of a Bluetooth module, which is a secondary electronic component of the second mini PCI module shown in FIG. 2.

On the other hand, if the secondary electronic component 60 of the mini PCI card 54 is the Bluetooth module, whose function block diagram is shown in FIG. 6, a wireless signal the antenna set 16 receives is to travel from the first antenna pin 76 and the second antenna pin 78, via an antenna RF & receiver, a Bluetooth unit, and a PCI Bridge of the Bluetooth module, the signal pins of the mini PCI card 54 (including the first signal pin 68, the 61 second signal pins 70, the third signal pin 72, and the 61 fourth signal pins 74), and the signal connection ends of the mini PCI slot 52 (including the first signal connection end 80, the 61 second signal connection ends 82, the third signal connection end 84, and the 61 fourth signal connection ends 86), to the main electronic component 20.

As described previously, some of the 124 signal pins of the mini PCI are defined to be the spare signal pins without any predefined purpose. Of a second embodiment of the present invention, an antenna set of a notebook can be electrically connected to signal connection ends corresponding to the spare signal pins of the 124 signal pins of the mini PCI. Therefore, as soon as a mini PCI card is inserted into its corresponding mini PCI slot of the notebook, a main electronic component of the notebook can exchange signals with the antenna set right away.

In contrast to the prior art, the mini PCI module, in addition to the 124 signal pins and the 124 signal connection ends, further comprises the antenna pin set and the antenna connection end set. Therefore, an antenna set of a notebook having the mini PCI module can be electrically connected to the antenna connection end set of the mini PCI module in advance, and a main electronic component of the notebook can exchange signals with the antenna set right after the mini PCI card is inserted into the mini PCI slot.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A mini peripheral component interconnect (PCI) module having an antenna pin set for electrically connecting to an antenna set, the mini PCI module comprising:
- a mini PCI card comprising:
  - a secondary circuit board;
  - a fool-proof device installed on the secondary circuit board;
  - a first signal pin installed by a first side of the fool-proof device on a first surface of the secondary circuit board;
  - 61 second signal pins installed by a second side of the fool-proof device on the first surface of the secondary circuit board;
  - a third signal pin installed by the first side of the fool-proof device on a second surface of the secondary circuit board;
  - 61 fourth signal pins installed by the second side of the fool-proof device on the second surface of the secondary circuit board;
  - the antenna pin set installed on the secondary circuit board; and
  - an audio/video (A/V) module installed on the secondary circuit board, the A/V module being electrically connected to the antenna pin set and the signal pins of the mini PCI card; and
- a mini PCI slot for the mini PCI card to be inserted into, the mini PCI slot comprising:
  - a first signal connection end corresponding to the first signal pin of the mini PCI card;
  - 61 second signal connection ends corresponding to the 61 second signal pins of the mini PCI card;
  - a third signal connection end corresponding to the third signal pin of the mini PCI card;
  - 61 fourth signal connection ends corresponding to the 61 fourth signal pins of the mini PCI card; and
  - an antenna connection end set corresponding to the antenna pin set of the mini PCI card for electrically connecting to the antenna set;

wherein when the mini PCI card is inserted into the mini PCI slot, the first signal pin is electrically connected to the first signal connection end, the 61 second signal pins are electrically connected to the 61 second signal connection ends, the third signal pin is electrically connected to the third signal connection end, the 61 fourth signal pins are electrically connected to the 61 fourth signal connection ends, and the antenna pin set is electrically connected to the antenna connection end set.

2. The mini PCI module of claim 1, wherein the antenna pin set is installed in parallel with the signal pins on the secondary circuit board.

3. The mini PCI module of claim 1, wherein the mini PCI card further comprises:

- a mini PCI housing for casing the secondary circuit board; and
- an A/V hole installed on the mini PCI housing for an A/V terminal to be inserted into, the A/V hole being electrically connected to the A/V module.

4. The mini PCI module of claim 2, wherein the antenna pin set comprises a first antenna pin and a second antenna pin.

5. The mini PCI module of claim 3, wherein the A/V module is an Analog TV module.

6. The mini PCI module of claim 3, wherein the A/V module is a Digital TV module.

7. The mini PCI module of claim 3, wherein the A/V module is a GPS TV module.

8. The mini PCI module of claim 3, wherein the A/V module is a GPRS TV module.

9. The mini PCI module of claim 3, wherein the A/V module is an Analog/Digital TV module.

10. The mini PCI module of claim 4, wherein both the first antenna pin and the second antenna pin are installed on the first surface of the secondary circuit board.

11. The mini PCI module of claim 4, wherein the first antenna pin is installed on the first surface of the secondary circuit board, while the second antenna pin is installed on the second surface of the secondary circuit board.

12. The mini PCI module of claim 9, wherein the A/V hole is an Analog TV hole.

13. The mini PCI module of claim 9, wherein the A/V hole is a Digital TV hole.

14. The mini PCI module of claim 9, wherein the A/V hole is an AVS TV hole.

15. The mini PCI module of claim 10, wherein both the first antenna pin and the second antenna pin are installed by the first side of the fool-proof device.

16. The mini PCI module of claim 10, wherein both the first antenna pin and the second antenna pin are installed by the second side of the fool-proof device.

17. The mini PCI module of claim 10, wherein the first antenna pin is installed by the first side of the fool-proof device, while the second antenna pin is installed by the second side of the fool-proof device.

18. The mini PCI module of claim 11, wherein the first antenna pin is installed on a first position of the first surface of the secondary circuit board, the first position corresponding to a second position where the second antenna pin is installed on the second surface of the secondary circuit board.

19. The mini PCI module of claim 18, wherein the first antenna pin is installed by the first side of the fool-proof device on the first surface of the secondary circuit board.

20. The mini PCI module of claim 18, wherein the first antenna pin is installed by the second side of the fool-proof device on the first surface of the secondary circuit board.

* * * * *